United States Patent
Uphus et al.

(10) Patent No.: US 11,420,375 B2
(45) Date of Patent: *Aug. 23, 2022

(54) EXTRUDER AND METHOD FOR EXTRUDING CORD REINFORCED TIRE COMPONENTS

(71) Applicant: VMI Holland B.V., Epe (NL)

(72) Inventors: Reinhard Uphus, Epe (NL); Ide Gooden, Zwolle (NL); Gerben Mulder, Vaassen (NL)

(73) Assignee: VMI HOLLAND B.V.

( * ) Notice: Subject to any disclaimer, the term of this patent is extended or adjusted under 35 U.S.C. 154(b) by 115 days.

This patent is subject to a terminal disclaimer.

(21) Appl. No.: 17/030,225

(22) Filed: Sep. 23, 2020

(65) Prior Publication Data

US 2021/0001530 A1      Jan. 7, 2021

Related U.S. Application Data

(62) Division of application No. 15/558,161, filed as application No. PCT/EP2016/050117 on Jan. 6, 2016, now Pat. No. 10,814,542.

(30) Foreign Application Priority Data

Mar. 13, 2015   (NL) ..................................... 2014454

(51) Int. Cl.
*B29C 48/156*     (2019.01)
*B29C 48/07*      (2019.01)
(Continued)

(52) U.S. Cl.
CPC ............ *B29C 48/156* (2019.02); *B29C 48/07* (2019.02); *B29C 48/12* (2019.02); *B29C 48/154* (2019.02);
(Continued)

(58) Field of Classification Search
CPC ...... B29C 48/156; B29C 48/154; B29C 48/92; B29C 48/865; B29C 48/872; B29C 48/07;
(Continued)

(56) References Cited

U.S. PATENT DOCUMENTS 5,069,850 A      12/1991   Tompkins et al. ...... B29C 47/22
5,670,208 A *    9/1997    Chikiri .................... D07B 7/145
                                                      427/538

(Continued)

FOREIGN PATENT DOCUMENTS

CN          101166617       4/2008     ............. B29C 47/28
CN          101332651       12/2008    ............. B29C 41/30
(Continued)

OTHER PUBLICATIONS

Oki, JPH08103972, Apr. 1996, machine translation Japanese to English (Year: 1996).*

(Continued)

*Primary Examiner* — Joseph S Del Sole
*Assistant Examiner* — Lawrence D. Hohenbrink, Jr.
(74) *Attorney, Agent, or Firm* — Hayes Soloway P.C.

(57) ABSTRACT

Disclosed is an extruder and a method for extruding cord reinforced tire components, wherein the extruder includes an extruder head with a die and a cord guide, wherein the die is provided with a cross sectional profile that defines a first cross section of the extrusion material in the die, wherein the cross sectional profile has a profile height, wherein the cord guide is arranged for guiding the cords into the die at a cord entry height, wherein the extruder head is provided with first heating elements, wherein the extruder comprises a control unit that is operationally connected to the first heating elements for generating an adjustable height temperature gradient in the extrusion material across the profile height to control swelling of the extrusion material relative to the cord (Continued)

entry height from the first cross section to a second cross section after the extrusion material leaves the die.

15 Claims, 5 Drawing Sheets

(51) Int. Cl.
 B29C 48/34 (2019.01)
 B29C 48/92 (2019.01)
 B29C 48/154 (2019.01)
 B29C 48/30 (2019.01)
 B29C 48/86 (2019.01)
 B29D 30/52 (2006.01)
 B29C 48/12 (2019.01)
 B29D 30/38 (2006.01)
 B29L 30/00 (2006.01)
 B29D 30/30 (2006.01)
 B29D 30/08 (2006.01)
 B29D 30/16 (2006.01)

(52) U.S. Cl.
 CPC .......... *B29C 48/30* (2019.02); *B29C 48/304* (2019.02); *B29C 48/34* (2019.02); *B29C 48/865* (2019.02); *B29C 48/872* (2019.02); *B29C 48/92* (2019.02); *B29D 30/52* (2013.01); B29C 2948/92076 (2019.02); B29C 2948/92209 (2019.02); B29C 2948/92409 (2019.02); B29C 2948/92447 (2019.02); B29C 2948/92571 (2019.02); B29C 2948/92704 (2019.02); B29C 2948/92904 (2019.02); B29C 2948/92942 (2019.02); B29D 30/08 (2013.01); B29D 30/1607 (2013.01); B29D 30/3007 (2013.01); B29D 2030/381 (2013.01); B29L 2030/003 (2013.01)

(58) Field of Classification Search
 CPC ....... B29C 48/30; B29C 48/304; B29C 48/34; B29C 48/12; B29C 2948/92209; B29C 2948/92704; B29C 2948/92447; B29C 2948/92571; B29C 2948/92904; B29C 2948/92076; B29C 2948/92942; B29C 2948/92409; B29D 30/52; B29D 30/08; B29D 30/1607; B29D 30/3007; B29D 2030/381; B29L 2030/003

USPC .................................................... 264/176.1
See application file for complete search history.

(56) References Cited

U.S. PATENT DOCUMENTS

| 8,197,242 | B2 | 6/2012 | Nicolas ..................... 425/113 |
| 8,585,949 | B2 | 11/2013 | Ponta et al. ................ 264/176.1 |
| 10,814,542 | B2 * | 10/2020 | Uphus ................... B29C 48/865 |
| 2005/0147702 | A1 | 7/2005 | Higashi ......................... 425/113 |
| 2009/0174103 | A1 | 7/2009 | Ponta et al. ........... B29D 30/00 |
| 2011/0198017 | A1 | 8/2011 | Marchini ....................... 156/117 |

FOREIGN PATENT DOCUMENTS

| CN | 102196899 | 9/2011 | ............ B29C 47/02 |
| EP | 0609597 | 8/1994 | ............ B29C 47/02 |
| EP | 1 213 121 | 6/2002 | ............ B29C 47/02 |
| JP | H04197726 | 7/1992 | ............ B29C 47/02 |
| JP | H0623163 3 | 8/1994 | ............ B29C 47/28 |
| JP | H06231633 A * | 8/1994 | |
| JP | H08103972 * | 4/1996 | |
| JP | H08103972 A * | 4/1996 | |
| JP | H08267543 | 10/1996 | ............ B29C 47/86 |
| JP | 2006027068 | 2/2006 | ............ B29C 47/02 |
| WO | WO200600023 6 | 1/2006 | ............ B29C 47/02 |
| WO | WO2006114117 | 11/2006 | ............ B29C 47/28 |

OTHER PUBLICATIONS

JPH06231633A, Murakami et al.Apr. 1994, machine translation (Year: 1994).*
JPH08103972A, Oki, Masahiko, Apr. 23, 1996, machine translation (Year: 1996).*
Chinese Office Action (w/translation) issued in application No. 2017-547433, dated Jun. 17, 2020 (6 pgs).
Chinese Office Action issued in China Patent Appln. No. 201680015198.8, dated Apr. 17, 2019, with machine translation, 17 pgs.
International Preliminary Report on Patentability issued in application No. PCT/EP2016/050117, dated Feb. 22, 2017 (21 pgs).
International Search Report and Written Opinion issued in application No. PCT/EP2016/050117, dated Apr. 8, 2016 (13 pgs).
Japanese Office Action (w/translation) issued in application No. 2017-547433, dated Oct. 8, 2019 (7 pgs).
Taiwan Office Action issued in Taiwan Patent Appln. No. 105100521, dated Jun. 13, 2019, with machine translation, 6 pages.

* cited by examiner

EXTRUDER AND METHOD FOR EXTRUDING CORD REINFORCED TIRE COMPONENTS

CROSS REFERENCE TO RELATED APPLICATIONS

This application is a divisional application of U.S. patent application Ser. No. 15/558,161, filed Sep. 13, 2017, which is a US National Phase (371) of PCT International Serial No. PCT/EP2016/050117, filed Jan. 6, 2016, which claims priority from Netherlands Patent Application 2014454, filed Mar. 13, 2015, the contents of which are incorporated herein.

BACKGROUND

The invention relates to an extruder and a method for extruding cord reinforced tire components.

A known extruder comprises an extruder head for extruding cord reinforced tire components comprises a die defining a cross sectional profile through which an extrusion material is forced and a cord guide for guiding the reinforcement cords into the die. As soon as the reinforcement cords leave the cord guide and enter into the die, they are embedded into the extrusion material and are no longer guided by the cord guide. As the extrusion material is substantially uniform, the reinforcement cords are embedded in a constant position relative to the cross section of the tire component. An accurate positioning of the reinforcement cords with respect to the cross section of the tire component is critical to obtain the desired characteristics for the tire component. Usually, the reinforcement cords are prepositioned in the cord guide with respect to the cross section of the die within a tolerance of 5/100 millimeter.

It may be desirable to change the relative positioning of the reinforcement cords with respect to the cross section of the tire component to meet specific requirements for a specific batch of tire components. Currently, this requires replacing the extruder head with another extruder head having a different cord guide. As extruder heads are extremely expensive pieces of tooling, having a specific extruder head for each reinforcement cord position is very costly. Furthermore, interchanging extruder heads takes time and results in undesirable downtime of the extruder head.

It is an object of the present invention to provide an extruder and a method for extruding cord reinforced tire components, wherein the flexibility in positioning of the cords within the tire component can be improved.

SUMMARY OF THE INVENTION

According to a first aspect, the invention provides an extruder with an extruder head for extruding cord reinforced tire components, wherein the extruder head comprises a die for receiving an extrusion material and a cord guide for guiding cords into the die so that in use the cords are embedded in the extrusion material, wherein the die is provided with a cross sectional profile that defines a first cross section of the extrusion material in the die, wherein the cross sectional profile has a profile height, wherein the cord guide is arranged for guiding the cords into the die at a cord entry height with respect to the profile height, wherein the extruder head is provided with one or more first heating elements which are arranged to transfer heat into the extrusion material from a first side of the profile height, wherein the extruder further comprises a control unit that is operationally connected to the one or more first heating elements for generating an adjustable height temperature gradient in the extrusion material across the profile height to control swelling of the extrusion material relative to the cord entry height from the first cross section to a second cross section after the extrusion material leaves the die.

The adjustable height temperature gradient can cause a first viscosity and an associated first flow rate of the extrusion material in the bottom section that is unequal to a second viscosity and an associated second flow rate of the extrusion material in the top section. Through controlling the non-uniform viscosities and flow rates across the profile height, one can effectively control the swelling of the extrusion material from the first cross section to the second cross section after the extrusion material leaves the die. A lower viscosity allows the extrusion material to flow more easily through the die at a higher flow rate, while the velocity at which the cords are fed through the die remains constant. When the flow rate is higher than the cord velocity, the extrusion material will swell after leaving the die to a greater height with respect to the cord entry height. Therefore, one can control the final cord height in proportion to the height of the extrudate. The final cord height with respect to the height of the extrudate can be controlled to be proportionally different from the cord entry height with respect to the profile height. It is therefore no longer necessary to change extruder heads when a different cord position with respect to the cross section of the extrusion material is required. One can simply use the control unit in combination with the one or more first heating elements to adjust the range of the height temperature gradient to control the relative position of the cords with respect to the second cross section of the extrusion material.

JPH 06 231633 A discloses a known circumferential extrusion coating device with a crosshead for coating a rubber plastic lining cable. The circumferential flow channel of the cross head is divided into a plurality of zones, each with its own temperature regulating device. The temperature regulating device is controlled based on the measurements of a downstream flow temperature sensor. The goal of this known extrusion coating device is to provide an even coverage of the coating in the circumferential direction of the cable. Throughout JPH 06 231633 A, it is taught that the temperature distribution should be uniform and homogenous. JPH 06 231633 A explicitly discloses that any temperature gradient is lost and that thickness deviations in the radial direction, the circumferential direction and the longitudinal direction are prevented. JPH 06 231633 A does not disclose an extruder head for extruding cord reinforced tire components. Furthermore, JPH 06 231633 A does neither hint nor suggest a control unit that is arranged for purposely generating and controlling an adjustable height temperature gradient in the extrusion material across a profile height.

In an embodiment the one or more first heating elements are positioned at the die for transferring heat into the extrusion material from the first side of the profile height at the die. Preferably, the extruder is provided with flow channels that debouch into die, wherein the one or more first heating elements are positioned at the die downstream of the flow channels for transferring heat into the extrusion material from the first side of the profile height at the die. The position of the one or more first heating elements at the die allow for a better and/or direct control of the final cord height with respect to the cord entry height by generating a height temperature gradient at the die. It is noted that in the known crosshead of JPH 06 231633 A, the temperature regulating devices are located upstream of the die in the flow channels and, as such, are not arranged for accurately controlling the final cord height, if any, at the die.

In a preferred embodiment the height temperature gradient across the profile height is at least five degrees Celsius, and preferably at least ten degrees Celsius. Such a height temperature gradient can generate a noticeable difference in the amount of swelling of the extrusion material between the bottom section and the top section.

In an embodiment the one or more first heating elements comprises a plurality of the first heating elements distributed across the profile width. The plurality of first heating elements can more uniformly transfer the heat into the extrusion material from the first side.

In a highly versatile embodiment thereof the control unit is arranged for individually controlling the temperature of each of the plurality of first heating elements across the profile width. Thus, the heat being transferred into the extrusion material across the profile width from the first side can be accurately controlled.

In an embodiment the control unit is arranged for generating the height temperature gradient in the extrusion material across the entire profile width or substantially the entire profile width. The swelling of the extrusion material from the first cross section to the second cross section can thus be controlled across the entire profile width. Preferably, the control unit is arranged for generating the height temperature gradient uniformly in the extrusion material across the entire profile width or substantially the entire profile width. The extrusion material can thus be controlled to swell uniformly in the direction of the profile height across the entire profile width.

In a more elaborate embodiment the extruder head comprises one or more second heating elements which are arranged to transfer heat into the extrusion material from a second side of the profile height, opposite to the first side, wherein the control unit is operationally connected to the one or more first heating elements and the one or more second heating elements for generating the adjustable height temperature gradient in the extrusion material across the profile height to control the swelling of the extrusion material after the extrusion material leaves the die. One can simply use the control unit in combination with the one or more first heating elements and the one or more second heating elements to adjust the range of the height temperature gradient and/or the direction of increase of the height temperature gradient to control the amount and/or the direction of the swelling of the extrusion material.

In an embodiment the one or more second heating elements are positioned at the die for transferring heat into the extrusion material from the second side of the profile height at the die. Preferably, the extruder is provided with flow channels that debouch into die, wherein the one or more second heating elements are positioned at the die downstream of the flow channels for transferring heat into the extrusion material from the second side of the profile height at the die. The position of the one or more first heating elements and the one or more second heating elements at the die allow for a better and/or direct control of the final cord height with respect to the cord entry height by generating a height temperature gradient at the die. Again, it is noted that in the known crosshead of JPH 06 231633 A, the temperature regulating devices are located upstream of the die in the flow channels and, as such, are not arranged for accurately controlling the final cord height, if any, at the die.

In an embodiment the control unit is arranged for switching between a first mode in which the height temperature gradient is controlled to increase in temperature from the first side towards the second side and a second mode in which the height temperature gradient is controlled to increase in temperature from the second side towards the first side. The direction of the swelling can thus be directed towards the section at the side with the lowest viscosity, being the first side in the first mode and the second side in the second mode.

In an embodiment the one or more second heating elements comprises a plurality of the second heating elements distributed across the profile width. The plurality of second heating elements can more uniformly transfer the heat into the extrusion material from the second side.

In an embodiment the control unit is arranged for individually controlling the temperature of each of the plurality of second heating elements across the profile width. Thus, the heat being transferred into the extrusion material across the profile width from the second side can be accurately controlled.

In an embodiment each of the plurality of first heating elements is arranged opposite to one of the plurality of second heating elements in the direction of the profile height, wherein the control unit is arranged for generating the height temperature gradient between each set of two opposite heating elements. Thus, for each position across the profile width, the height temperature gradient can be generated by the heating elements on opposite sides of the profile height at that position.

In an embodiment the control unit is arranged for generating an adjustable width temperature gradient across the profile width in addition to the adjustable height temperature gradient in the profile height. The width temperature gradient can be particularly useful to ensure that the extrusion material reaches far ends of the profile width.

Preferably, the extruder head is provided with flow channels which are arranged to be in fluid communication with a supply of the extrusion material from a lateral end of the extruder head for receiving the extrusion material into the die parallel to the profile width, wherein the control unit is arranged for controlling the width temperature gradient so that it increases towards the distal end of the profile width with respect to the supply of the extrusion material. The extruder with a lateral supply of extrusion material is known as a 'cross die'. The direction of increase of the width temperature gradient can be used to ensure that the extrusion material reaches the distal end of the cross sectional profile with respect to the extrusion material source.

In an embodiment the control unit is arranged for controlling the minimum temperature of the plurality of the first heating elements and the plurality of the second heating elements to at least eighty degrees Celsius, and preferably at least ninety degrees Celsius. The minimum temperature can corresponds to a maximum viscosity that is allowed for proper extrusion of the extrusion material. In an embodiment the cross sectional profile comprises at least one tapering area, wherein the control unit is arranged for locally increasing the temperature in said at least one tapering area. The local increase in temperature can allow the extrusion material to flow more easily into tapering areas or other narrow areas of the cross sectional profile.

In an embodiment the extrusion in use cures to become an extrudate, wherein the cords are at a final cord height within the extrudate, wherein the extruder comprises a sensor for detecting the final cord height of the cords in the extrudate. The sensor can be used to validate the positioning of the cords within the extrudate.

Preferably, the sensor is an inductive sensor. The inductive sensor can electronically sense the proximity of the cords to the sensor, without damaging the extrudate.

Preferably the control unit is arranged for generating the height temperature gradient based on the measurements from the sensor. The feedback from the sensor to the control unit can improve the accuracy of the cord positioning and may even allow for in-line adjustments of the swelling.

In an embodiment the heat is arranged to be transferred conductively. The heat can thus be transferred indirectly, e.g. through the material of the extruder head into the extrusion material.

In a further embodiment the profile width extends in a horizontal or substantially horizontal direction, and/or wherein the profile height extends in a vertical or substantially vertical direction.

In an embodiment the cross sectional profile is elongate in the direction of the profile width with respect to a relatively small profile height.

In an embodiment the die has a cross sectional profile that is arranged to extrude sheets and/or films, in particular a tire tread.

According to a second aspect, the invention provides a method for extruding cord reinforced tire components with the use of the aforementioned extruder comprising an extruder head, wherein the extruder head comprises a die for receiving an extrusion material and a cord guide for guiding cords into the die, wherein the die is provided with a cross sectional profile that defines a first cross section of the extrusion material in the die, wherein the cross sectional profile has a profile height, wherein the extruder head is provided with one or more first heating elements, wherein the extruder further comprises a control unit that is operationally connected to the one or more first heating elements, wherein the method comprises the steps of receiving an extrusion material in the die, guiding cords from the cord guide into the die at a cord entry height with respect to the profile height so that the cords are embedded in the extrusion material, controlling the one or more first heating elements with the control unit to transfer heat into the extrusion material from a first side of the profile height for generating an adjustable height temperature gradient in the extrusion material across the profile height, and controlling swelling of the extrusion material relative to the cord entry height from the first cross section to a second cross section after the extrusion material leaves the die by adjusting the adjustable height temperature gradient.

In a preferred embodiment of the method the height temperature gradient across the profile height is at least five degrees Celsius, and preferably at least ten degrees Celsius.

In an embodiment the one or more first heating elements comprises a plurality of the first heating elements distributed across the profile width, wherein the method comprises the step of individually controlling the temperature of each of the plurality of first heating elements across the profile width.

In an embodiment the height temperature gradient is generated in the extrusion material across the entire profile width or substantially the entire profile width. Preferably, the height temperature gradient is generated uniformly in the extrusion material across the entire profile width or substantially the entire profile width.

In a more elaborate embodiment the extruder head comprises one or more second heating elements, wherein the control unit is operationally connected to the one or more first heating elements and the one or more second heating elements, wherein the method comprises the steps of controlling the one or more first heating elements and the one or more second heating elements with the control unit to transfer heat into the extrusion material from the first side and a second side opposite to the first side, respectively, of the profile height, for generating an adjustable height temperature gradient in the extrusion material across the profile height, and controlling the swelling of the extrusion material relative to the cord entry height from the first cross section to a second cross section after the extrusion material leaves the die by adjusting the adjustable height temperature gradient.

In an embodiment the method comprises switching the control unit between a first mode in which the height temperature gradient is controlled to increase in temperature from the first side towards the second side and a second mode in which the height temperature gradient is controlled to increase in temperature from the second side towards the first side.

In an embodiment the one or more second heating elements comprises a plurality of the second heating elements distributed across the profile width, wherein the method comprises the step of individually controlling the temperature of each of the plurality of second heating elements across the profile width.

In an embodiment each of the plurality of first heating elements is arranged opposite to one of the plurality of second heating elements in the direction of the profile height, wherein the method comprises generating the height temperature gradient between each set of two opposite heating elements.

In an embodiment the method comprises generating an adjustable width temperature gradient across the profile width in addition to the adjustable height temperature gradient in the profile height.

In an embodiment the method comprises the step of controlling the minimum temperature of the plurality of the first heating elements and the plurality of the second heating elements to be at least eighty degrees Celsius, and preferably at least ninety degrees Celsius.

In an embodiment the cross sectional profile comprises at least one tapering area, wherein the method comprises the step of locally increasing the temperature in said at least one tapering area.

In an embodiment the extrusion material cures to become an extrudate, wherein the cords are at a final cord height within the height of the extrudate, wherein the extruder comprises a sensor for detecting the final cord height of the cords in the extrudate, wherein the method comprises the step of controlling the height temperature gradient based on the measurements from the sensor.

The method provides for steps of using the aforementioned extruder and as such has the same advantages over the prior art as described before in relation to the corresponding features of the extruder.

In a particular embodiment of the method, the tire components are tire components of the group comprising breaker plies, body plies, cap strips, chafers or any other tire components with cords.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figures 1A, 1B:
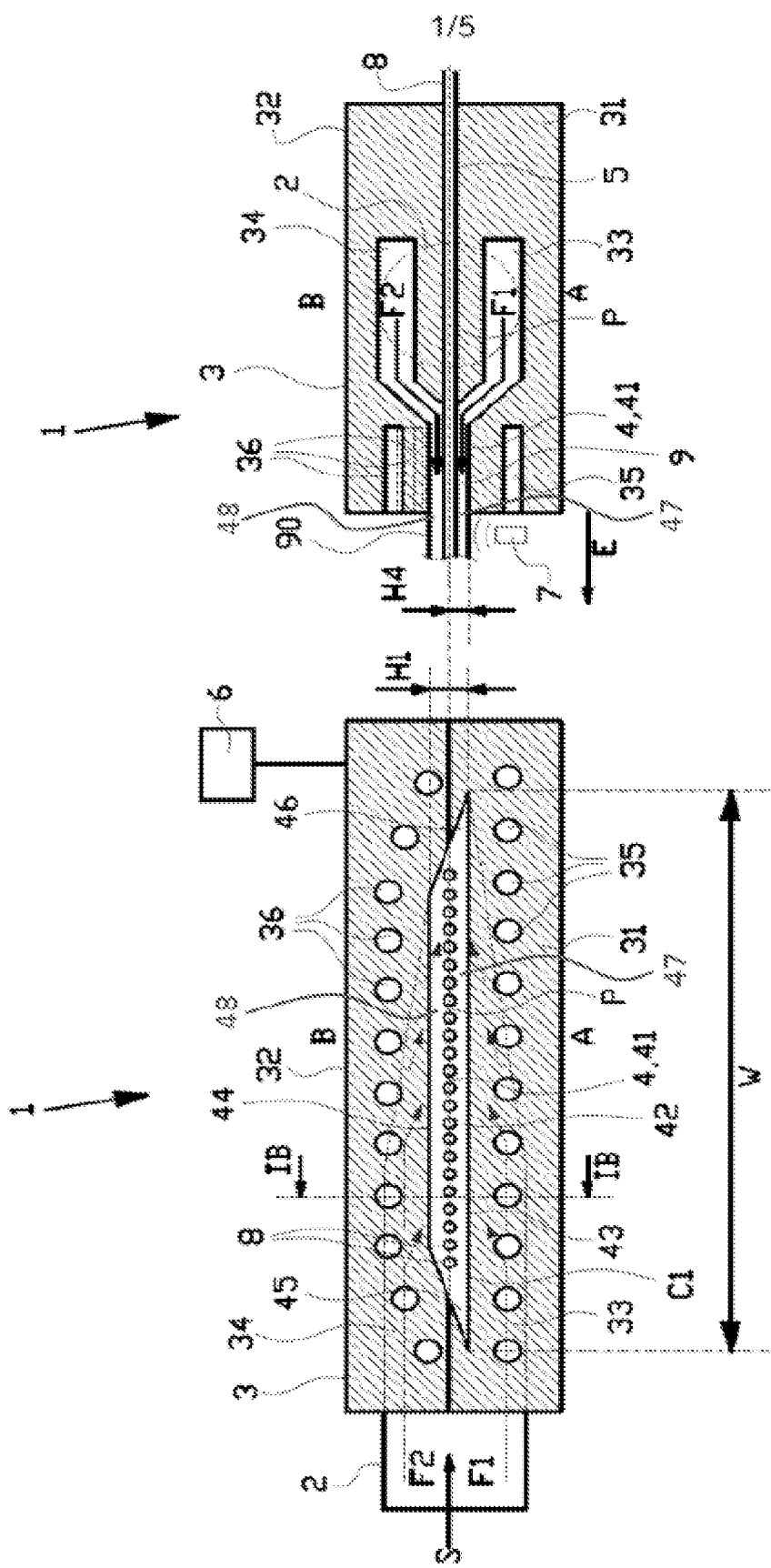
FIG. 1A shows a front view of an extruder with an extruder head according to the invention, comprising a cord guide and a die.
FIG. 1B shows a cross section of the extruder head according to the line IB-IB in FIG. 1A.

FIGS. 1A and 1B show an extruder 1 according to the invention, for extruding extrudate 90 in the form of cord reinforced tire components. The cord reinforced tire components are formed by embedding cords 8, preferably steel or textile reinforcement cords, into an extrusion material 9, preferably an elastomeric or rubber compound, during the extruding.

The extruder 1 comprises an extrusion material source 2 for supplying the extrusion material 9 in a supply direction S and an extruder head 3 for receiving the extrusion material 9 from the extrusion material source 2 in the supply direction S. The extruder head 3 comprises a die 4 for directing the extrusion material 9 from the supply direction S into an extrusion direction E while forming the extrusion material 9 into a desired shape of the extrudate as defined by the die 4. The supply direction S is perpendicular to the extrusion direction E, such that the extrusion material 9 is supplied laterally or from a lateral end of the extruder 1 into the die 4. A die 4 that is arranged for receiving the extrusion material 9 laterally is known as a 'cross die'. The extruder 1 is provided with a cord guide 5 for guiding the cords 8 in a guide plane P in the extrusion direction E into the die 4 so that in use the cords 8 are embedded in the extrusion material 9. The extruder 1 further comprises a control unit 6 and optionally a sensor 7, for controlling parameters of the extrusion.

The extruder head 3 comprises a first extruder half 31 and a second extruder half 32 which, when mounted together as in FIGS. 1A and 1B, enclose the die 4 and the cord guide 5 with the guide plane P in between. The extruder halves 31, 32 can be disassembled in a manner known per se to insert the cords 8 in between the extruder halves 31, 32 at the cord guide 5. In this example, the first extruder half 31 is located at the bottom of the extruder head 3, and the second extruder half 32 is located at the top of the extruder head 3 or on top of the first extruder half 31. The extruder head 3 comprises a first flow channel 33 in the first extruder half 31 and a second flow channel 34 in the second extruder half 32. The flow channels 33, 34 are in fluid communication with the extrusion material source 2 in the supply direction S, at a lateral end of the extruder head 3, to direct separate flows of extrusion material 9 into the die 4, as schematically shown with arrows F1 and F2. The flow channels 33, 34 extend laterally across the extruder head 3 to laterally distribute the extrusion material 9, before debouching or merging into the die 4 from opposite sides of the guide plane P.

Figure 2A:
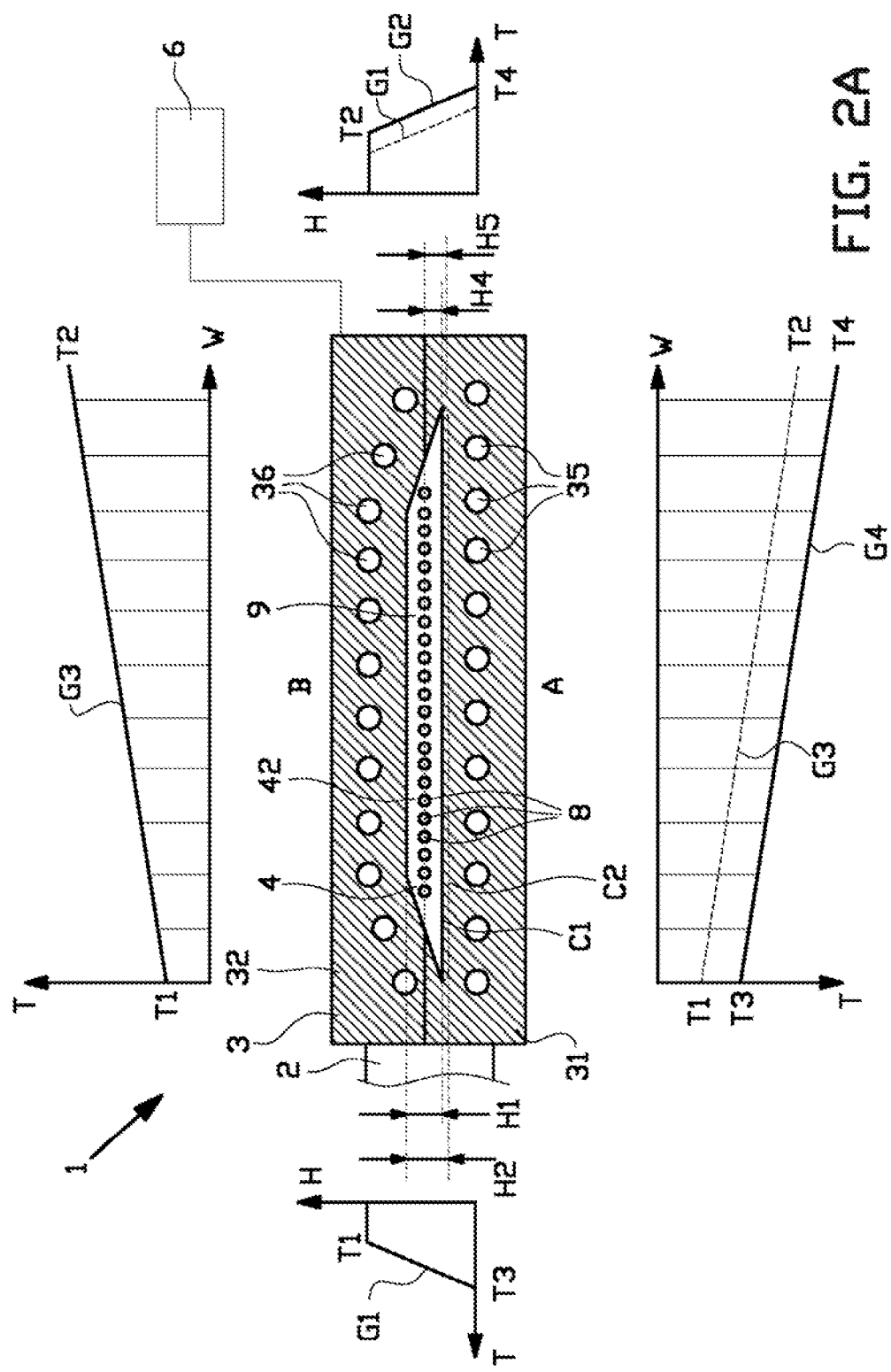
FIGS. 2A and 2B show the extruder according to FIGS. 1A and 1B, respectively, in which the relative position of the reinforcement cords is raised.
Figure 2B:
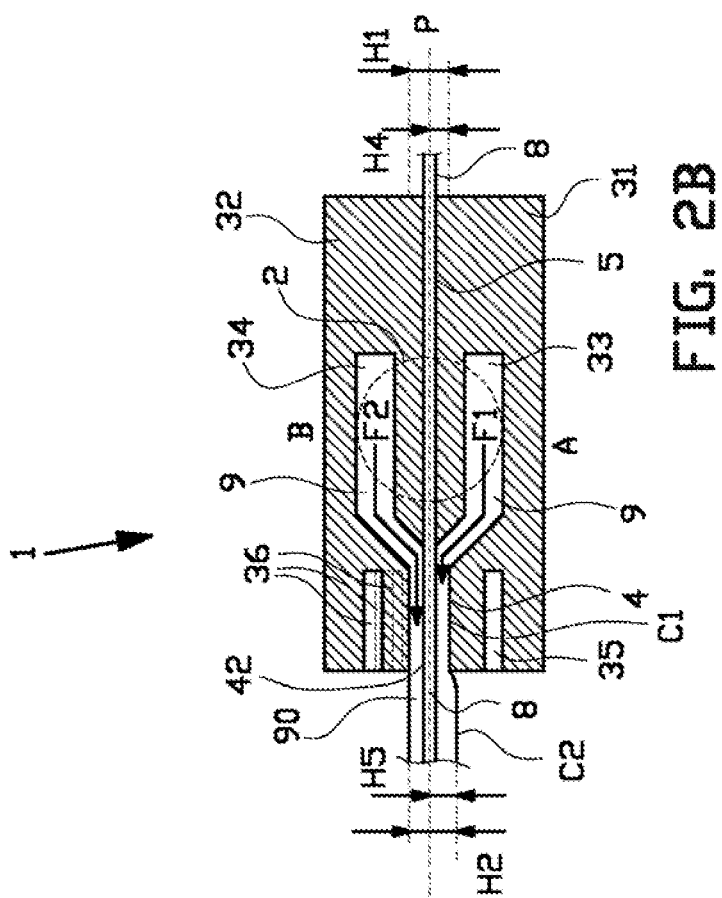

The die 4 is provided with an opening 41 having a cross sectional profile 42 that defines the shape of the extrusion material 9 in the die 4. The cross sectional profile 42 has a profile width W and a profile height H1. In this example, the profile width W extends in a horizontal or substantially horizontal direction and the profile height H1 extends in a vertical or substantially vertical direction. The cross sectional profile 42 is elongate in the direction of the profile width W and has a relatively small profile height H1 with respect to the profile width W. As such, the die 4 is arranged for extruding sheets and/or films. The cross sectional profile 42 divides the extruder head 3 into a first side A below the profile height H1 and a second side B above the profile height H1, in this example corresponding to the first extruder half 31 and the second extruder half 32, respectively. In the die 4, the extrusion material 9 has a first cross section C1. As shown in FIGS. 2A and 2B and in FIGS. 3A and 3B, the shape of the extrusion material 9 can be controlled to expand or swell from the first cross section C1 inside the die 4 to a second cross section C2 or a third cross section C3 outside the die 4 that is larger in surface area than the first cross section C1. The heights of the expanded second cross section C2 and the third cross section C3 have been indicated with H2 and H3, respectively. Swelling occurs when the extrusion material 9 is fed into the die 4 at a flow rate that exceeds the rate at which the cords 8 are fed into the die 4 in the extrusion direction E.

In this exemplary embodiment, the cross sectional profile 42 has a trapezoidal shape, comprising a straight or linear bottom edge 43, a straight or linear top edge 44 extending parallel to the bottom edge 43, and a first tapering or triangular area 45 and a second tapering or triangular area 46 connecting the bottom edge 43 to the top edge 44 at opposite ends of the profile width W. The shape of the exemplary cross sectional profile 42 is similar to and arranged for extruding the extrusion material 9 in the shape of a tire tread. It will however be evident to one skilled in the art that various cross sectional profiles are encompassed by the scope of the present invention.

The extruder head 3 is provided with one or more first heating elements, in this example a plurality of first heating elements 35, and one or more second heating elements, in this example a plurality of second heating elements 36. The first heating elements 35 extend in the first extruder half 31 and are arranged in direct contact with the material of the first extruder half 31, usually metal, for transferring heat into the material of the first extruder half 31, and ultimately, into the extrusion material 9 that is in direct contact with the first extruder half 31 at the first flow channel 33 and the die 4. In particular, the one or more first heating elements are located downstream of the first flow channel 33 at or along the die 4, for transferring heat into the material at the die 4. As shown in FIG. 1B the first heating elements 35 extend in a part of the extruder head 3 that vertically below the die 4. The second heating elements 36 extend in the second extruder half 32 and are arranged in direct contact with the material of the second extruder half 32, usually metal, for transferring heat into the material of the second extruder half 32, and ultimately, into the extrusion material 9 that is in direct contact with the second extruder half 32 at the second flow channel 34 and the die 4. In particular, the one or more second heating elements are located downstream of the second flow channel 34 at or along the die 4, for transferring heat into the material at the die 4. As shown in FIG. 1B the second heating elements 36 extend in a part of the extruder head 3 that vertically above the die 4. Preferably, the heat is transferred conductively. However, other means of heat transfer, such as heat radiation, may also be applied. In this example, the first heating elements 35 and the second heating elements 36 are formed as integral channels within the respective extruder halves 31, 32 for receiving a heating medium that is in direct contact with the respective extruder halves 31, 32. Alternatively, the first heating elements 35 and the second heating elements 36 may be formed as electrical heaters.

The first heating elements 35 and the second heating elements 36 are distributed parallel to or across the profile width W of the cross sectional profile 42. Preferably, the first heating elements 35 and the second heating elements 36 are evenly distributed across the profile width W so that heat can be evenly transferred into the extruder halves 31, 32 and ultimately the extrusion material 9. Most preferably, for each of the first heating elements 35, there is a second heating element 36 opposite to it in the direction of the profile height H1. As shown in FIG. 1A the first heating elements 35 in the first extruder half 31 are arranged at a constant distance in the direction of the profile height H1 to the bottom edge 43 of the cross sectional profile 42, while the second heating elements 36 in the second extruder half 32 are arranged at a constant distance in the direction of the profile height H1 to the top edge 44 and the tapering areas 45, 46. Consequently, the at least the second heating elements 36 which are positioned at the second side B above the tapering areas 45, 46 are closer to the guide plane P and the first heating elements 35 across from the profile height H1.

The heat generated by each of the first heating elements 35 and the second heating elements 36 is adjustable in a manner that will be described in more detail hereafter.

As shown in FIG. 1B, the cord guide 5 is formed at the mating between the extruder halves 31, 32. The cord guide 5 comprises a plurality of known, mutually parallel guide channels (not shown) formed in one or both of the extruder halves 31, 32 and arranged for guiding each of the cords 8 in the guide plane P towards the die 4. The guide plane P extends between the extruder halves 31, 32 at a cord entry height H4 with respect to the bottom or the bottom edge 43 of the cross sectional profile 42. The cord guide 5 extends up to the die 4, but not into the die 4. The cords 8 are introduced from the cord guide 5 into the die 4 at the cord entry height H4 and are immediately embedded at said cord entry height H4 into the extrusion material 9 flowing into the die 4 from both sides A, B of the profile height H1 from the flow channels 33, 34. For the purpose of the invention, the cord entry height H4 is expressed as a relative or proportional value, in particular as a percentage of the profile height H1. In this example, the cord entry height H4 is approximately 50% of the profile height H1. The cord entry height H4 and/or the guide plane P split the cross sectional profile 42 into a lower section 47 below the cord entry height H4 and a upper section 48 above the cord entry height H4. Each section 47, 48 receives a volume of extrusion material 9, which volumes together embed the cords 8 from the opposite sides A, B of the guide plane P.

The control unit 6, as shown in FIG. 1A, is operationally connected to each of the first heating elements 35 and each of the second heating elements 36 for individually controlling the heat or the temperature of the heat of each of the aforementioned heating elements 35, 36. The control unit 6 is specifically arranged for controlling the first heating elements 35 and/or the second heating elements 36 to generate an adjustable height temperature difference, delta or gradient G1, G2 in the extrusion material 9 across the profile height H1, as schematically shown in temperature graphs in FIGS. 2A and 2B and FIGS. 3A and 3B. The height temperature gradient G1, G2 causes a non-uniform viscosity in the extrusion material 9 across the profile height H1. More specifically, the height temperature gradient G1, G2 causes the viscosity of the extrusion material 9 in one of the lower section 47 and the upper section 48 to be unequal to the viscosity of the extrusion material 9 in the other of the lower section 47 and the upper section 48.

Figure 3A:
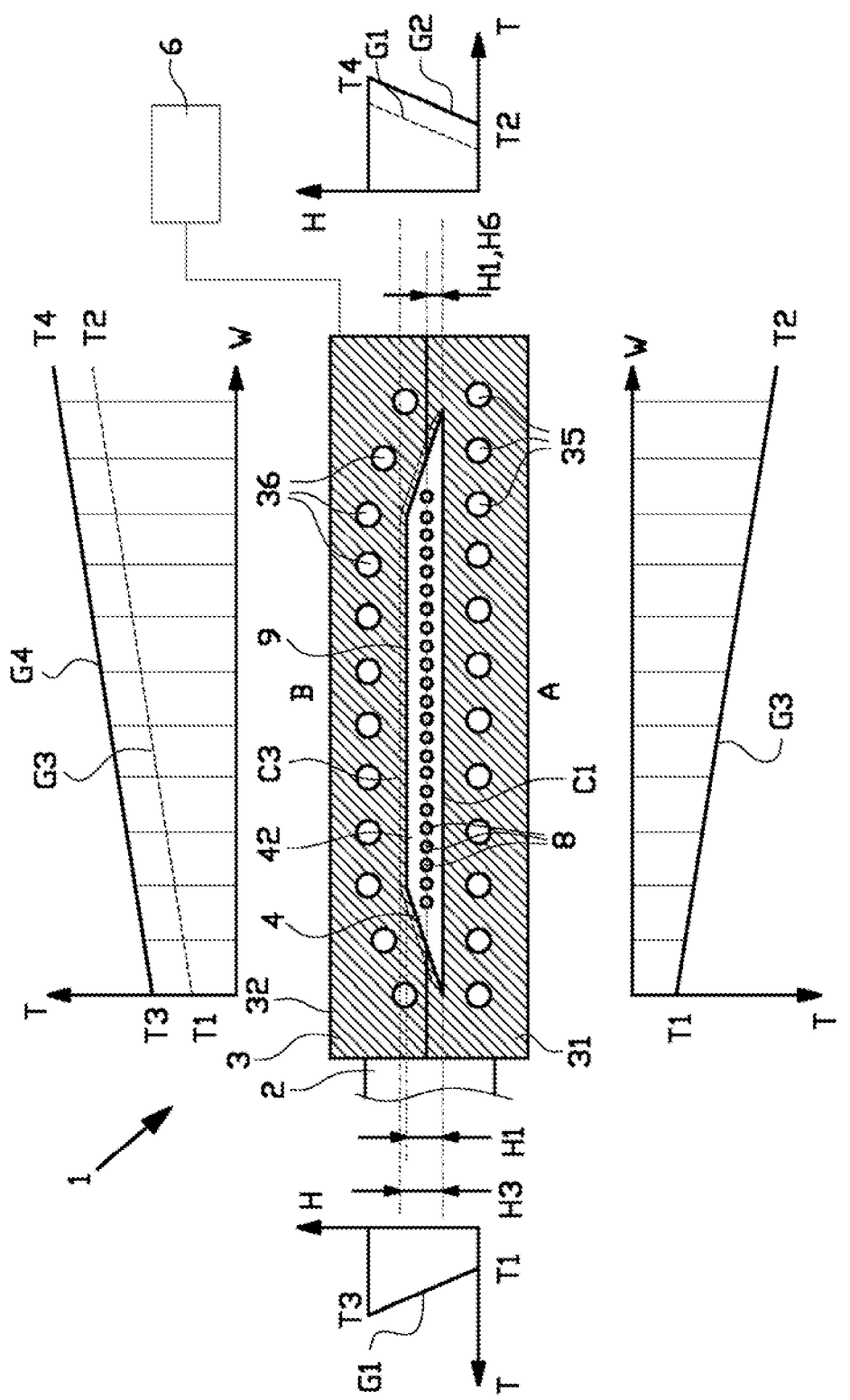
FIGS. 3A and 3B show the extruder according to FIGS. 1A and 1B, respectively, in which the relative position of the reinforcement cords is lowered.
Figure 3B:
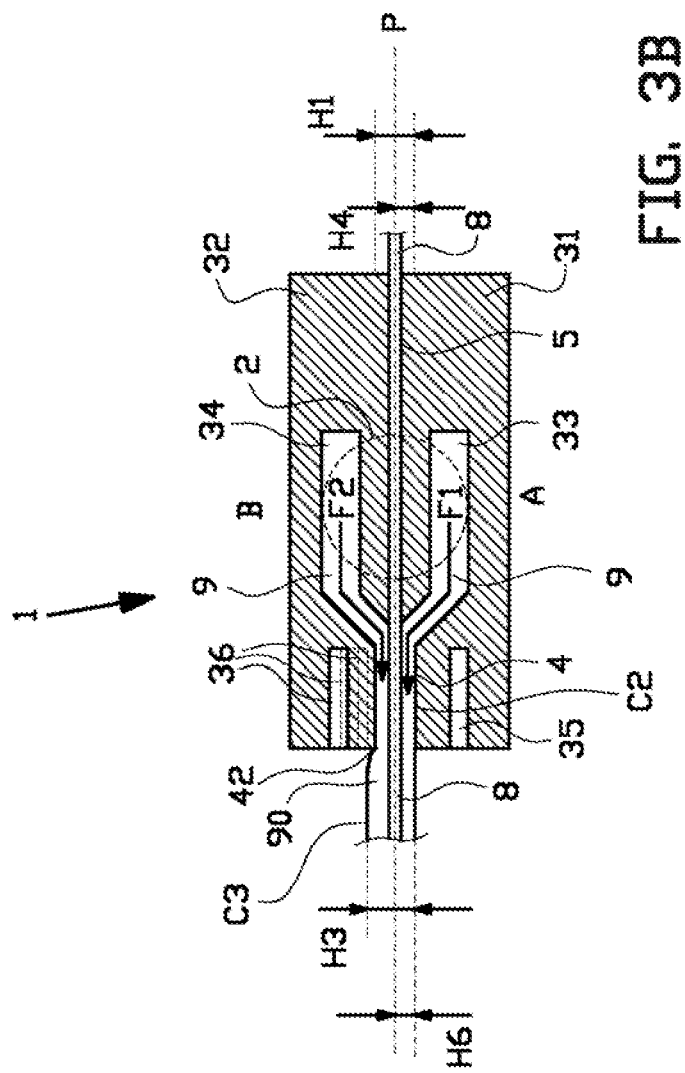

The method for extruding cord reinforced tire components with the use of the aforementioned extruder 1 is described with reference to a normal condition as shown in FIGS. 1A and 1B, a first mode as shown in FIGS. 2A and 2B and a second mode as shown in FIGS. 3A and 3B.

In the normal condition of FIGS. 1A and 1B, the control unit 6 is arranged for setting each of the first heating elements 35 and each of the respective second heating elements 36 opposite to the first heating elements 35 in the direction of the profile height H1 to the same or substantially the same temperature, so that the temperature in the extrusion material 9 across the profile height H1 is substantially constant. This also applies to a condition in which the first heating elements 35 and the second heating elements 36 are inactive. The cords 8 entering the die 4 from the cord guide 5 at the cord entry height H4 will be embedded in the extrusion material 9 flowing into the die 4 from both sides A, B of the guide plane P. In the normal condition, the viscosity in the extrusion material 9 is substantially constant across the profile height H1. As a result, the flows F1, F2 of extrusion material 9 in the lower section 47 and the upper section 48 have an equal viscosity and thus flow with the same velocity and volumetric rate in the extrusion direction E. Therefore, the extrusion material 9 after leaving the die 4 does not swell or swells uniformly towards both sides A, B. As a result the cords 8 will substantially remain at the cord entry height H4, in this example at approximately 50% of the profile height H1.

In the first mode and the second mode, as shown in FIGS. 2A and 2B and FIGS. 3A and 3B, respectively, the control unit 6 is arranged to control the height temperature gradient G1, G2 to ultimately affect and/or change the swelling of the extrusion material 9 after it leaves the die 4 to an extent in which the relative position of the swollen, second cross section C2 of the extrudate 90 relative to the cord entry height H4 is lowered. To achieve this, the control unit 6 is arranged for generating an adjustable height temperature gradient G1, G2 that increases from the second side B towards the first side A of the profile height H1. Specifically, the control unit 6 is either arranged for activating the first heating elements 35 only, or alternatively is arranged for setting first heating elements 35 to a higher temperature than the temperature of the respective second heating elements 36. In each case, a disproportional amount of heat is transferred into the extrusion material 9 from the first side A of the profile height H1 to increase the viscosity of the extrusion material 9 in the lower section 47 with respect to the extrusion material 9 in the upper section 48.

The temperature height gradient G1, G2 generates a non-uniform viscosity in the extrusion material 9 across the profile height H1. The flow F1 of extrusion material 9 flowing at the lower section 47 has a lower viscosity than the other flow F2, resulting in a higher flow rate than the other flow F1 in the upper section 48. In particular, the velocity at which the extrusion material 9 flows through the lower section 47 in the extrusion direction E is higher than the velocity at which the cords 8 are fed in the same extrusion direction E. This results in a surplus volume of extrusion material 9 leaving the die 4 from the lower section 47 under a relatively high pressure and expanding in the direction of the first side A. The shape of the extrusion material 9 swells or expands from the first cross section C1 in the die 4 towards the second cross section C2 outside the die 4 and then cures to form the extrudate 90.

As a result, the cords 8 extending at the cord entry height H4 become situated at a final cord height H5 with respect to the height H2 of the extrudate 90 that is relatively or proportionally higher than the cord entry height H4 with respect to the profile height H1. In particular, in this example, the final cord height H5 is at approximately 60% of the height H2 of the extrudate 90 with respect to the bottom (side A) of the extrudate 90. In other words, the thickness of the extrusion material 9 in the extrudate 90 at the first side A has increased with respect to the thickness of the same extrusion material 9 when it was contained in the die 4.

In the second mode, as shown in FIGS. 3A and 3B, the control unit 6 is arranged for generating an adjustable height temperature gradient G1, G2 that increases from the first side A towards the second side B of the profile height H1. Specifically, the control unit 6 is either arranged for activating the second heating elements 36 only, or alternatively is arranged for setting second heating elements 36 to a higher temperature than the temperature of the respective first heating elements 35. In each case, a disproportional amount of heat is transferred into the extrusion material 9 from the second side B of the profile height H1 to increase the viscosity of the extrusion material 9 in the upper section 48 with respect to the extrusion material 9 in the lower section 47.

As a result, the third cross section C3 is expanded with respect to the first cross section C1 in the direction of the second side B. As a result of the increased height H3 of the second cross section C3, the cords 8 become situated at a final cord height H6 with respect to the height H3 of the second cross section C3 that is relatively or proportionally lower than the entry cord height H4 with respect to the profile height H1. In this example, the final cord height H6 is only 40% of the height H3 of the second cross section C3. In other words, the thickness of the extrusion material 9 above the final cord height H6 is substantially thicker than the thickness of the extrusion material 9 that was above the cord entry height H4 when the extrusion material 9 was still contained in the die 4.

In each of the aforementioned modes, the control unit 6 is arranged for generating a local increase in temperature (not shown) or an additional, adjustable width temperature difference, delta or gradient G3, G4, and thus an additional, adjustable non-uniform viscosity, in the extrusion material 9 across the profile width W. The width temperature gradient G3, G4 is schematically shown in FIGS. 2A and 2B and FIGS. 3A and 3B in temperature graphs. Preferably, the control unit 6 is arranged to control the first heating elements 35 and the second heating elements 36 such that the width temperature gradient G3, G4 increases from the extrusion material source 2 towards the distal end of the cross section profile 42 with respect to the extrusion material source 2. As a result, the temperature of the second heating elements 36 in the first mode increases as a result of the width temperature gradient G3 from a first temperature T1 to a second temperature T2 in the profile width W, while the temperature of the first heating elements 35 in the first mode increases as a result of the width temperature gradient G4 from a third temperature T3 to a fourth temperature T4. Similarly, the temperature of the first heating elements 35 in the second mode increases as a result of the width temperature gradient G3 from the first temperature T1 to the second temperature T2 in the profile width W, while the temperature of the second heating elements 36 in the second mode increases as a result of the width temperature gradient G4 from the third temperature T3 to the fourth temperature T4.

The width temperature gradient G3, G4 may be particularly useful to ensure that the extrusion material 9 reaches the distal end of the cross sectional profile 42 with respect to the extrusion material source 2. The local increase in temperature (not shown) may result in the extrusion material 9 more easily flowing into the tapering areas 45, 46 or other narrow areas of the cross sectional profile 42.

Depending on the mode, the control unit 6 is arranged for the heating elements 35, 36 on one side A, B of the profile height H1 to the first temperature T1 or, in the case of the aforementioned width temperature gradient G3, G4, to a temperature range between the first temperature T1 and the second temperature T2, while setting the heating elements 35, 36 at the other side A, B to a third temperature T3 or, in the case of the aforementioned width temperature gradient G3, G4, to a temperature range between the third temperature T3 and the fourth temperature T4. Each heating element 35, 36 at the one side A, B is set to a temperature that is higher than the temperature of the respective heating element 35, 36 opposite or vertically opposite to the heating element 35, 36 in the direction of the profile height H1, at the other side A, B. The temperature difference between each of the first heating elements 35 and their respective opposite second heating elements 36 is preferably at least five degrees Celsius, and more preferably at least ten degrees Celsius. Similarly, the range of the height temperature gradient G1, G2 in the extrusion material 9 across the profile height H1 is preferably at least five degrees Celsius, and more preferably at least ten degrees Celsius.

The control unit 6 is arranged for generating the adjustable height temperature gradient G1, G2 across the entire profile width W to ensure a uniform control of the swelling of the first cross section C1 to the second cross section C2 with respect to the cord entry height H4. In particular, the control unit 6 is arranged for controlling the first heating elements 35 and the second heating elements 36 as a first group and a second group offset with respect to the first group with the height temperature gradient G1, G2. The control unit 6 is arranged for adjusting the range or amount of the height temperature gradient G1, G2 and/or the width temperature gradient G3, G4. The control unit 6 is further arranged for switching between the first mode and the second mode, thereby changing the direction of the height temperature gradient G1, G2.

In the exemplary modes as shown in FIGS. 2A and 2B and FIGS. 3A and 3B, the first temperature T1 is eighty (80) degrees Celsius, the second temperature T2 is one-hundred (100) degrees Celsius, the third temperature T3 is eighty-five (85) degrees Celsius and the fourth temperature T4 is one-hundred-and-twenty-five (125) degrees Celsius. The temperatures T1-T4 are adjustable and can be variably controlled by the control unit 6, depending on the type of extrusion material 9, the desired cord height H2, H3 and/or optimization of the distribution or swelling of the extrusion material 9 across the profile width W. In this exemplary embodiment, the first heating elements 35 and the second heating elements 36 are used to heat the extrusion material 9 up to a minimum temperature corresponding to a maximum viscosity that is allowed for proper extrusion of the extrusion material 9. For an extrusion material 9 in the form of a typical elastomeric compound for tire components, the minimum temperature is at least eighty (80) degrees Celsius, and preferably at least ninety (90) degrees Celsius. Consequently, the first temperature T1 of the second heating elements 36 in the first mode is at least equal to the aforementioned minimum temperature.

In the aforementioned modes, the control unit 6 is programmed based on given data about rubber compounds and their respective viscosities under various temperatures T1-T4. The actual cord height H2, H3 may be experimentally validated by cutting extruded tire components to reveal the second cross section C2 or the third cross section C3 and the relative position of the cords 8 therein. The findings from the experimental validation can subsequently be used to improve the data and programming of the control unit 6.

Additionally or alternatively, the optional sensor 7, as shown in FIG. 1B, can be provided at the exit of the die 4 where the extrusion material 9 exits the extruder head 3 in the extrusion direction E. The sensor 7 is used to determine the actual cord height H2, H3 of the cords 8 in the extrusion material 9. In this example, the sensor 7 is an inductive sensor that electronically senses the proximity of the metallic cords 8 in the extrusion material 8. The sensor 7 is operationally connect to the control unit 6 for sending signals indicative of the proximity of the cords 8 with respect to the sensor 7 to the control unit 6. The control unit 6 can therefore determine if the actual cord height H2, H3 with respect to the second or third cross section C2, C3 corresponds to the desired cord height H2, H3 and, if necessary, adjust the temperatures of the first heating elements 35 and the second heating elements 36 improve the actual cord height H2, H3 with respect to the desired cord height H2, H3. This feedback between the sensor 7 and the control unit 6 can further improve the accuracy of the extruder 1 and may even allow for in-line adjustments of the swelling.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A method for extruding cord reinforced tire components with the use of an extruder comprising an extruder head, wherein the extruder head comprises a die for receiving an extrusion material and a cord guide for guiding cords into the die, wherein the die is provided with an elongate cross sectional profile that defines a first cross section of the extrusion material in the die, wherein the cross sectional profile has a profile width and a profile height, wherein the extruder head is provided with one or more first heating elements, wherein the extruder further comprises a control unit that is operationally connected to the one or more first heating elements, wherein the method comprises the steps of receiving the extrusion material in the die, guiding cords from the cord guide into the die at a cord entry height with respect to the profile height so that the cords are embedded in the extrusion material, controlling the one or more first heating elements with the control unit to transfer heat into the extrusion material from a first side of the profile height for generating an adjustable height temperature gradient in the extrusion material across the profile height, and controlling swelling of the extrusion material relative to the cord entry height from the first cross section to a second cross section after the extrusion material leaves the die by adjusting the adjustable height temperature gradient, wherein the one or more first heating elements comprises a plurality of the first heating elements distributed across the profile width, wherein the method comprises the step of individually controlling the temperature of each of the plurality of first heating elements across the profile width.

2. The method according to claim 1, wherein the extruder head comprises one or more second heating elements, wherein the control unit is operationally connected to the one or more first heating elements and the one or more second heating elements, wherein the method comprises the steps of controlling the one or more first heating elements and the one or more second heating elements with the control unit to transfer heat into the extrusion material from the first side and a second side opposite to the first side, respectively, of the profile height, for generating the adjustable height temperature gradient in the extrusion material across the profile height, and controlling the swelling of the extrusion material relative to the cord entry height from the first cross section to the second cross section after the extrusion material leaves the die by adjusting the adjustable height temperature gradient.

3. The method according to claim 2, wherein the one or more second heating elements comprises a plurality of the second heating elements distributed across the profile width, wherein the method comprises the step of individually controlling the temperature of each of the plurality of second heating elements across the profile width.

4. The method according to claim 3, wherein each of the plurality of first heating elements is arranged opposite to one of the plurality of second heating elements in the direction of the profile height, wherein the method comprises generating the adjustable height temperature gradient between each set of two opposite heating elements.

5. An extruder with an extruder head for extruding cord reinforced tire components, wherein the extruder head comprises a die for receiving an extrusion material and a cord guide for guiding cords into the die so that in use the cords are embedded in the extrusion material, wherein the die is provided with an elongate cross sectional profile that defines a first cross section of the extrusion material in the die, wherein the cross sectional profile has a profile width and a profile height, wherein the cord guide is arranged for guiding the cords into the die at a cord entry height with respect to the profile height, wherein the extruder head is provided with one or more first heating elements which are arranged to transfer heat into the extrusion material from a first side of the profile height, wherein the extruder further comprises a control unit that is operationally connected to the one or more first heating elements for generating an adjustable height temperature gradient in the extrusion material across the profile height to control swelling of the extrusion material relative to the cord entry height from the first cross section to a second cross section after the extrusion material leaves the die, wherein the one or more first heating elements comprises a plurality of the first heating elements distributed across the profile width, wherein the control unit is arranged for individually controlling the temperature of each of the plurality of first heating elements across the profile width.

6. The extruder according to claim 5, wherein the extruder head comprises one or more second heating elements which are arranged to transfer heat into the extrusion material from a second side of the profile height, opposite to the first side, wherein the control unit is operationally connected to the one or more first heating elements and the one or more second heating elements for generating the adjustable height temperature gradient in the extrusion material across the profile height to control the swelling of the extrusion material after the extrusion material leaves the die.

7. The extruder according to claim 6, wherein the one or more second heating elements comprises a plurality of the second heating elements distributed across the profile width, wherein the control unit is arranged for individually controlling the temperature of each of the plurality of second heating elements across the profile width.

8. The extruder according to claim 7, wherein each of the plurality of first heating elements is arranged opposite to one of the plurality of second heating elements in the direction of the profile height, wherein the control unit is arranged for generating the adjustable height temperature gradient between each set of two opposite heating elements.

9. The extruder according to claim 7, wherein the control unit is arranged for generating an adjustable width temperature gradient across the profile width in addition to the adjustable height temperature gradient in the profile height.

10. The extruder according to claim 9, wherein the extruder head is provided with flow channels which are arranged to be in fluid communication with a supply of the extrusion material from a lateral end of the extruder head for receiving the extrusion material into the die parallel to the profile width, wherein the control unit is arranged for controlling the adjustable width temperature gradient so that said adjustable width temperature gradient increases towards the distal end of the profile width with respect to the supply of the extrusion material.

11. The extruder according to claim 9, wherein the control unit is arranged for controlling the minimum temperature of the plurality of the first heating elements and the plurality of the second heating elements to at least eighty degrees Celsius.

12. The extruder according to claim 5, wherein the one or more first heating elements are positioned at the die for transferring heat into the extrusion material from the first side of the profile height at the die.

13. The extruder according to claim 5, wherein the extruder is provided with flow channels that debouch into die, wherein the one or more first heating elements are positioned at the die downstream of the flow channels for transferring heat into the extrusion material from the first side of the profile height at the die.

14. The extruder according to claim 6, wherein the one or more second heating elements are positioned at the die for transferring heat into the extrusion material from the second side of the profile height at the die.

15. The extruder according to claim 6, wherein the extruder is provided with flow channels that debouch into die, wherein the one or more second heating elements are positioned at the die downstream of the flow channels for transferring heat into the extrusion material from the second side of the profile height at the die.

* * * * *